Sept. 15, 1964  D. R. CHRISTIE ETAL  3,149,003
APPARATUS FOR TREATING ENDLESS FABRICS
Filed April 18, 1960  3 Sheets-Sheet 1

Sept. 15, 1964  D. R. CHRISTIE ETAL  3,149,003
APPARATUS FOR TREATING ENDLESS FABRICS
Filed April 18, 1960  3 Sheets-Sheet 3

3,149,003
APPARATUS FOR TREATING ENDLESS FABRICS
Donald R. Christie, Albany, N.Y., and Arthur Schiff, Knoxville, Tenn., assignors to Huyck Corporation, New York, N.Y., a corporation of New York
Filed Apr. 18, 1960, Ser. No. 22,973
8 Claims. (Cl. 118—34)

The present invention relates to a process and apparatus for the manufacture, from non-metallic fabrics in endless form, of belt-like structures having specific characteristics which adapt them for specialized uses, many of which could not heretofore be fulfilled by non-metallic fabrics, as well as for uses in which they achieve results which are superior to those heretofore achieved by metallic or non-metallic fabrics. Fabrics produced in accordance with the present invention may be used, for example, in papermaking and related processes as a replacement for and improvement upon the metallic screen structures heretofore used as Fourdrinier wires, or in the construction of forming cylinders, filters, dandy rolls and similar devices. Endless fabrics for use as Fourdrinier cloths are particularly important products of this invention and will be emphasized in the following disclosure but by such emphasis it is not intended to limit the invention to this particular form of endless fabric. This invention is particularly useful in connection with a fabric woven from yarns of synthetic fibrous material in multi-filament, mono-filament, staple fiber or other suitable forms or combinations thereof. As a result of the selection of particular yarns or combinations thereof and as a result of weaving and handling techniques, the fabric will have many desirable characteristics. The present invention imparts additional characteristics to the woven fabric to provide final products of unique quality. The provision of such fabrics for use in the papermaking field opens new horizons in quality of paper and simplification of papermaking machinery.

Fabrics of one general type which may be manufactured in accordance with the present invention and which are capable of the uses described above are disclosed and claimed in U.S. Patent No. 2,903,021 granted September 8, 1959. As disclosed in said patent, it is preferred that non-metallic fabrics, useful, for example, as Fourdrinier cloths and made from the synthetic materials which are suitable and available at the present time, be woven in endless form to avoid the need for joining or splicing. Also, as disclosed in said patent, it is preferred that the yarns, whether mono-filament, multi-filament, staple fiber or other construction, that are woven as the weft or wefts in the loom, extend in helical form circumferentially of the endless belt when it is finished and ready for its intended use. However, the present invention is not limited to use in connection with such endless-woven fabrics and may be used with fabrics that have been spliced or otherwise joined to make them endless.

Said Patent No. 2,903,021 also discloses the desirability of suitable treatment or other finishing steps to stabilize or otherwise condition the fabric to meet the demands which will be placed upon it. The present invention affords process and apparatus for carrying out an extremely broad range of treatments and/or finishing operations on endless fabrics. It is a particular feature of the present invention that the fabric is put into precisely controlled conditions including tensioning of the fabric in both directions to establish predetermined lengthwise and widthwise dimensions, with uniform yarn counts i.e. the number of warp yarns or weft yarns per inch throughout each dimension, and squaring of the fabric so that every transverse yarn thereof is substantially at right angles to the longitudinal yarns and the critical treatments and/or finishing operations are carried out while the fabric is maintained under such conditions. Examples of operations of various kinds which advantageously may be carried out in accordance with the present invention are setting, stabilizing, heat-setting, chemical treatment, washing, stretching, coating, impregnating or mechanical alterations such as drawing, embossing or smoothing, or specialized operations such as the removal of selected yarns as by selective dissolving or similar operations. To simplify the present disclosure the manufacture of Fourdrinier cloths and the stabilization thereof by heat-treating will be utilized as typical examples.

Thus, Fourdrinier cloths which are treated in accordance with the typical disclosures hereinbelow will have dimensional and temperature stability and resistance to shoving. Also they will have uniform porosity because the yarn count is made permanently uniform. The transverse yarns are permanently set square with the body of the fabric and with the longitudinal yarns. For all of these reasons the finished fabric will have the ability to avoid wrinkling. All of these characteristics are exhibited in such degree as to make such fabrics preferable in many respects to the metallic Fourdrinier wires heretofore utilized.

Inasmuch as the fabrics which are to be treated in accordance with the present invention are endless, they require special handling and equipment in order to establish the conditions referred to above. The apparatus and method constituting the present invention provide for the achievement of these several interrelated results with precision and facility. It is a particular advantage of the present apparatus and method that the specific conditions required for the manufacture of each particular fabric may be recorded and duplicated when desired for the purpose of filling a reorder of any one of the many different fabrics which may have been manufactured in the past.

The apparatus of the present invention consists of a pair of spaced, parallel, relatively movable guide rolls so mounted that an endless fabric may be moved over an end of each roll and directed around them like a belt. The rolls are moved apart to apply the degree of longitudinal tension to the fabric which is required to establish the length desired at any particular time. The apparatus also includes parallel chains movable toward and from each other and provided with tenter pins which engage the edges of a portion of the fabric to establish the desired width and to hold the fabric to uniform count i.e. construction and squareness within the portion thus engaged. The apparatus further comprises heating means which may be precisely controlled with respect to temperature and position relative to the fabric, by which the fabric may be subjected to heat treatment as it passes through the portion of the machine in which it is engaged, as aforesaid, by the tenter pins. The apparatus also comprises means for applying to the fabric one or more treating materials such as liquids, which may be dried or set by heat if so desired. The heat-treating or drying temperatures are applied to the portion of the moving fabric which is held under the conditions predetermined for the particular treatment. Furthermore, the apparatus provides for convenient inspection and repair of the fabric both before and after treatment as well as for testing of the finished fabric under temperature, tension and moisture conditions similar to those which will be encountered by the fabric in the use for which it is intended.

The method of the present invention consists broadly of the steps of placing an endless fabric under longitudinal tension and simultaneously placing a portion of that fabric under transverse tension to establish in that portion desired widthwise and lengthwise dimensions and accuracy as to count and squareness, and progressively advancing the endless fabric through an endless path with the result that the entire length of endless fabric is eventually moved through a zone of travel in which said desired conditions exist. In such zone the fabric is subjected to treatment, for example it may be heated or otherwise treated to set or stabilize the fabric or the yarns from which the fabric is woven, and/or to dry or to dry and heat-set any materials which may be applied to the fabric as a part of this process. The process also provides, for fabrics and/or resinous treating materials which require it, the step of cooling the fabric and/or the resinous material in the zone wherein the fabric continues to be maintained under the conditions aforesaid.

It is an object of the present invention, therefore, to provide apparatus and method for the treatment of endless bands or belts of fabric under precisely controllable conditions which establish accurately predetermined dimensions, count and squareness in both longitudinal and transverse directions.

In the drawings there is shown in somewhat diagrammatic and simplified form a machine embodying the present invention and upon which the method of the present invention may be practiced. It will be apparent that the embodiment of the invention shown in the drawings is merely illustrative of a preferred, but not necessarily the only form of apparatus, embodying the invention and providing the facilities for the practice of the method.

Figure 1:
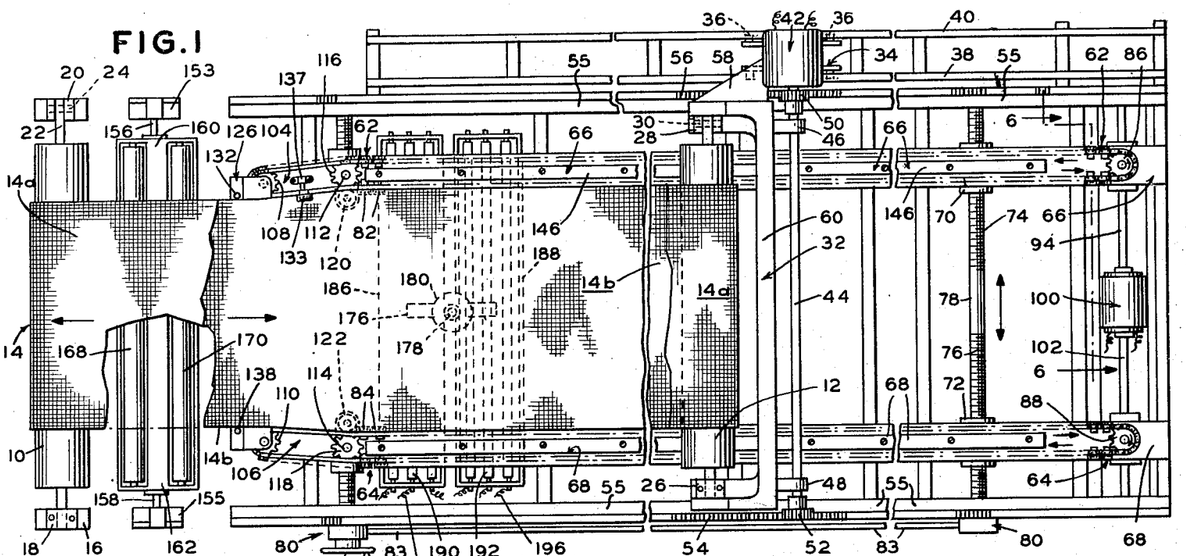
FIG. 1 is a plan view in somewhat diagrammatic and simplified form of apparatus embodying the present invention.
Figure 2:
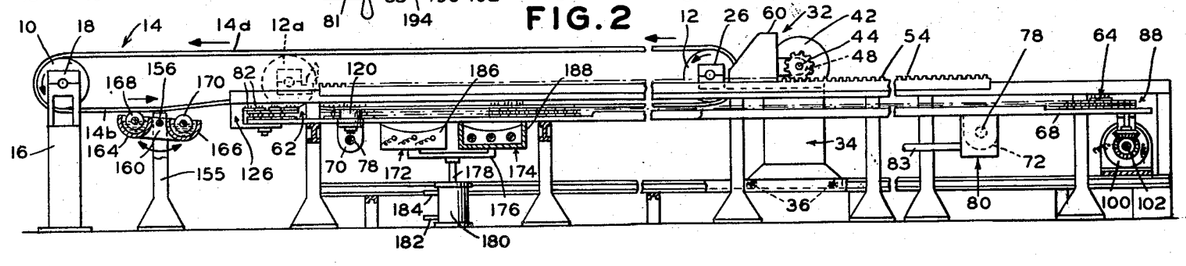
FIG. 2 is a side elevation of the same.

The machine shown in FIGS. 1 and 2 comprises generally a pair of parallel guide rolls 10 and 12 around which an endless woven fabric 14 may be guided in the manner of an endless belt. The roll 10 may be supported by a standard 16 provided with bearings 18 and 20 to receive the opposite ends of the central shaft 22 of the roll 10. The bearing 18 preferably is a split bearing in that the upper half thereof may be removed. The bearing 20 preferably is pivoted on an axis indicated at 24 which is transverse the axis of the shaft 22. When the upper half of the split bearing 18 is removed the associated end of the roll 10 may be swung upwardly and held in elevated position by suitable means (not shown) from which the endless fabric 14 may be threaded around the roll 10 by placing it over the elevated end. The roll 12 is similarly provided with a split bearing 26 and a bearing 28 which is pivoted upon an axis 30.

The roll 12 is mounted for rotation in the bearings 26 and 28 as aforesaid, which bearings are supported on a carriage indicated generally at 32, which is movable longitudinally of the machine for the purpose of varying the spacing between the rolls 10 and 12. The carriage 32 includes a driving portion 34 supported upon a plurality of wheels or rollers 36, which rest in channel-shaped rails 38 and 40 forming a part of the frame of the machine. The portion 34 of the carriage 32 contains a powerful electric motor and gear reduction unit indicated generally at 42, which serves to rotate a shaft 44 carried in bearings 46 and 48 on the carriage 32. At its opposite ends the shaft 44 has fixed thereto gears 50 and 52 which are positioned to mesh with longitudinally extending racks 54 and 56 forming a part of the frame of the machine. The portion 34 of the carriage 32 is connected by suitable structural elements, such as a triangular web 58, to a rigid U-shaped frame 60 which extends transversely of the machine and which serves to support the bearings 26 and 28 for the roll 12. The carriage 32 rests upon ways 55 (see FIG. 6) which extend substantially the full length of the machine on both sides. It will be understood that upon energization of the motor and gear reduction unit 42 the shaft 44 may be rotated in either direction whereupon the gears 50 and 52 will be effective to drive the carriage 32 to move the roll 12 toward and from the roll 10 as desired while maintaining precise parallelism between said rolls.

When it is desired to place a fabric 14 upon the machine or to remove it therefrom, the carriage 32 is moved toward the left as viewed in FIGS. 1 and 2 into a position wherein the roll 12 lies relatively close to the roll 10. For example, the roll 12 may be moved to a position such as that indicated in broken lines at 12a in FIG. 2. When the rolls 10 and 12 are in such adjacent relationship they may be elevated as described above for the convenient positioning of a fabric 14 thereon with the excess length of the fabric suitably gathered between them. When the rolls 10 and 12 are replaced in their respective bearings 18 and 26, the carriage 32 is then moved toward the right as viewed in FIG. 2 to draw the fabric 14 out to its full length. When thus extended the fabric 14 will have an upper reach 14a and a lower reach 14b extending between the rolls 10 and 12.

It will be appreciated that for use on papermaking and similar machines of different sizes and design there will be a wide variation in the width and in the total length of the Fourdrinier wires heretofore customarily used on such machines. In the case of Fourdrinier cloths of the type for which the present invention is particularly adapted, and which are woven endless, it is necessary to perform any operations, subsequent to weaving, upon such Fourdrinier cloth as an endless strtucture. This is distinguished from operations conducted upon metallic Fourdrinier wires which do not become endless until they are welded and is distinguished from operations performed upon textile fabrics which are customarily woven in indefinite lengths and which may be treated in the form of a continuous web. Accordingly, the machine of the present invention is preferably of such size and flexibility as to be capable of heat-setting and finishing operations upon endless fabric structures which may vary substantially as to width and total length. For example, a machine as illustrated herein which affords a maximum spacing of about ninety feet between the rolls 10 and 12 will provide for operations upon fabrics upon to approximately one hundred eighty feet in total length. Also, the machine should have sufficient width to accommodate a wide range of sizes. For example, a maximum width in the order of eighteen to twenty feet will permit the manufacturer of Fourdrinier cloths to fit a great many paper machines. Obviously wider and/or longer machines may be provided for fabrics of greater width and/or length. Also, machines of appropriate size may be provided for operation upon endless fabrics intended for use other than as Fourdrinier cloths, particularly when such fabrics may be of such size and proportions as to lie outside the range of adjustment of a machine used in connection with Fourdrinier cloths.

In the machine chosen for illustration herein the desired degree of longitudinal tension may be applied to an endless fabric 14 of any length within the capacity of the machine by moving the roll 12 relatively to the roll 10. Transverse tension is applied by adjustable means similar to a tenter but which is especially constructed for operation upon an endless fabric in cooperation with longitudinal tensioning means of the type described above.

For convenience in construction and operation it is preferred to position the transverse tensioning means for operation upon the lower reach 14b of an endless fabric extending between the rolls 10 and 12. With such preferred arrangement any heating devices which may be provided for heating the portion of the fabric which is under both longitudinal and transverse tension may be positioned conveniently beneath the machine and may be supported directly upon the floor or other base upon which the machine is mounted.

As shown in FIGS. 1 and 2, the transverse tensioning means comprises a pair of endless tenter chains 62 and 64 supported upon elongated guides indicated generally at 66 and 68 respectively. The supports 66 and 68 are mounted for movement relatively to one another transversely of the machine to vary the spacing between the tenter chains 62 and 64 while maintaining them parallel for accommodation of fabrics of different widths. Thus, by way of example, the guides 66 and 68 each may be provided with a plurality of downwardly extending brackets 70 and 72 respectively appropriately spaced along the length of each guide. The brackets 70 and 72 may be provided with portions which are threaded internally in opposite hands to receive respectively oppositely-handed threaded portions 74 and 76 of a plurality of parallel rotatable shafts 78 extending transversely of the machine. In a machine of considerable length there will be a relatively large number of shafts 78, only two of which are shown. All of the shafts 78 are interconnected by suitable means for simultaneous rotation whereby the tenter chains 62 and 64 are maintained parallel in any position of adjustment. For example, the shafts 78 may be provided at one or both ends with gear casings 80 having internal gearing which meshes with gears on a longitudinally extending shaft 83. The shafts 78 are sufficiently rigid and so supported as to provide adequate support and rigidity to the tenter chains 62 and 64. The bearings and supports for the shafts 78 and 83 have been omitted from the drawings.

As shown in FIG. 1, one or more of the shafts 78 may be provided with a handwheel 81 for manual adjustment of the tenter chains. However, it is preferred to also provide power driving means (not shown) controlled from a console or other suitable point (not shown) for this purpose.

As shown in FIG. 2, the tenter chains 62 and 64 are supported in a horizontal plane such that the tenter pins 82 and 84 carried by the chains will engage the edges of the lower reach 14b of a fabric 14 which is threaded around and tensioned between the rolls 10 and 12. To this end the tips of all of the tenter pins 82 and 84 lie in a horizontal plane which preferably is just slightly below the horizontal plane which is tangent to the lowermost portion of the surface of the roll 12. Thus the roll 12 will clear the tips of the pins as it is moved toward and from the roll 10. The pins 82 and 84 preferably are canted upwardly to assist in retaining the edges of the fabric (see FIG. 5). The fabric may be pressed downwardly into engagement with the pins 82 and 84, as will be described below.

Figures 5, 6:
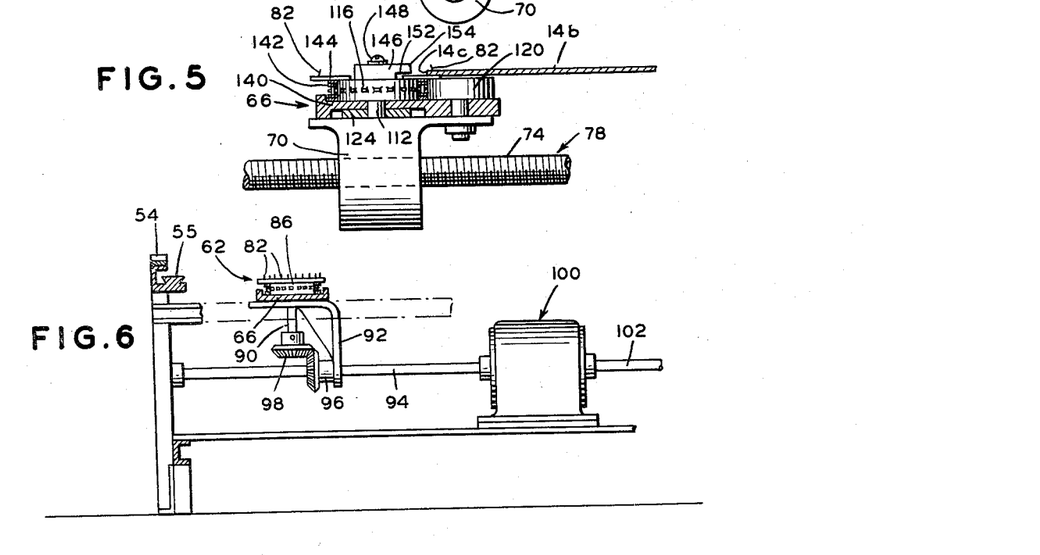
FIG. 5 is a section taken along the line 5—5 of FIG. 3.
FIG. 6 is a fragmentary section taken along the line 6—6 in FIG. 1.

The tenter chains 62 and 64 may be driven by sprockets 86 and 88 carried by the guides 66 and 68 adjacent the extreme right hand ends of the latter. Referring now to FIG. 6, it will be observed that the sprocket 86 is secured to a vertical shaft 90 extending through the guide 66 and a bracket 92 which is similar to the brackets 70 heretofore described. However, the bracket 92 rotatably receives a drive shaft 94 which is splined for the purpose of imparting rotation to a bevel gear 96 which in turn is rotatably supported upon the bracket 92. The bevel gear 96 meshes with a bevel gear 98 secured to the vertical shaft 90. The construction just described serves to maintain constant driving relationship between the splined drive shaft 94 and the sprocket 86 irrespective of the position of lateral adjustment in which the tenter chain 62 may be placed. It will be understood that a similar driving arrangement is provided for the sprocket 88 which drives the tenter chain 64. The splined drive shaft 94 is rotated in an appropriate direction by a motor and gear reduction unit indicated generally at 100. The unit 100 preferably is a variable speed unit with controls appropriately grouped with other controls at a console (not shown). A similar splined drive shaft 102 is provided for appropriate rotation of the sprocket 88 (see FIG. 2). Thus the inner reaches of the tenter chains 62 and 64 may be driven in the same direction and at any desired identical speed.

It is preferred that either or both of the rolls 10 and 12 be driven by variable speed mechanism (not shown) to rotate at appropriate speeds related to the speed of the chains 62 and 64 and related to any changes in dimensions of the fabric as a result of treatment thereof. As shown in FIGS. 1 and 2, the inner reaches of the tenter chains 62 and 64 are arranged to engage the adjacent edges of the lower reach 14b of the fabric 14 and the chains are driven in such direction as to move the lower reach 14b toward the right as viewed in FIGS. 1 and 2. Under these conditions it will be apparent that the tenter pins 82 and 84 will engage the edges of the lower reach 14b of the fabric and will retain engagement therewith to a point rather closely approaching the roll 12 at which point the fabric will be directed upwardly around the periphery of the roll 12, thus progressively to be disengaged from the tenter pins.

Appropriate provision is made for leading the edges of the lower reach 14b of the fabric into proper engagement with the tenter pins 82 and 84. Automatic edge guiding mechanisms of various types are commercially available and one such device is illustrated herein only to the extent necessary to make its operation clear. In a general sense it will be understood that to place a fabric under transverse tension by means of the tenter chains 62 and 64, such chains will be adjusted laterally of the machine to provide spacing between the inner reaches thereof which is somewhat greater than the width of the fabric. The edge guiding apparatus therefore must be effective to engage the edges of the fabric at its original width and to spread it progressively to the width established by the spacing of the major portion of the tenter chains. For purposes of illustration, the edge guiding mechanism may comprise pivoted extensions indicated generally at 104 and 106, respectively, carrying idler sprockets 108 and 110 around which the tenter chains 62 and 64 are conducted. The extensions 104 and 106 are pivoted respectively around the axes of shafts 112 and 114 which are rotatably carried by the guides 66 and 68. The shafts 112 and 114, respectively, carry idler sprockets 116 and 118. Thus the inner reaches of the tenter chains 62 and 64 stretching from the idler sprockets 116 and 118 rearwardly to the driving sprockets 86 and 88 will be maintained parallel and in the desired spacing for maintaining the fabric under a constant transverse tension as the lower reach 14b thereof moves toward the right as viewed in FIGS. 1 and 2.

Figure 3:
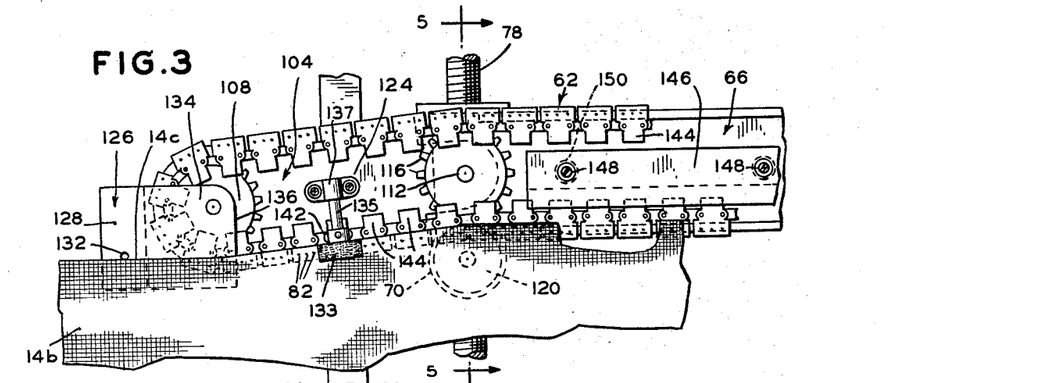
FIG. 3 is a fragmentary plan view of a detail of the apparatus.
Figure 4:
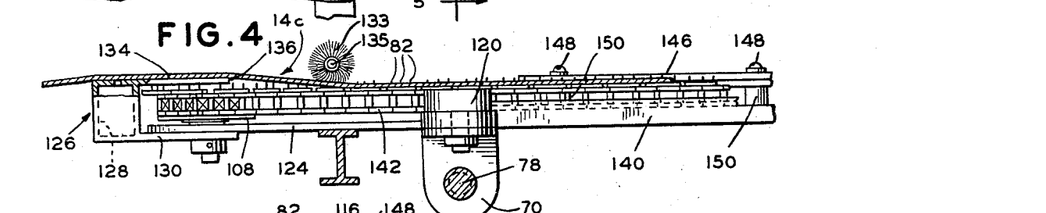
FIG. 4 is a fragmentary elevation with parts in section of the details shown in FIG. 3.

Idler rollers 120 and 122 are arranged to confine the tenter chains 62 and 64 against the idler sprockets 116 and 118 whereby the portions of these chains which extend into the extensions 104 and 106 may be swung in a horizontal plane without disturbing parallelism and desired spacing between the remaining portions of the chains. Referring now to FIGS. 3 and 4, the extension 104 for the tenter chain 62 may consist of a plate 124 which is pivoted for movement in a horizontal plane around the axis of the sprocket shaft 112. The plate 124 carries the idler sprocket 108 and also carries an edge-sensing device indicated generally at 126. For example, such edge-sensing device may include a hollow body 128 secured to a plate 130 which extends from the pivoted plate 124. The hollow body 128 may be connected to a source of air at superatmospheric or sub-atmospheric pressure (not shown). An aperture 132 opens into the hollow body 128 and is so positioned with respect to the tenter pins 82 that the edge 14c of the lower reach 14b when substantially aligned with the aperture 132 will be brought into engagement with the tenter pins 82 on the pivoted extension 104. For automatic operation the edge 14c of the fabric will cause a change in air pressure within the hollow body 128 depending upon the extent to which such edge overlaps the aperture 132. The changing pressure within the hollow body 128 may be sensed by any suitable means to control a hydraulic system (not shown) which in turn swings the extension 104, whereby to maintain a constant relationship between the aperture 132 and the edge 14c of the fabric. The hydraulic mechanism, or its equivalent, exerts sufficient force upon the extension 104 to maintain it in the desired angular position whereby the fabric may be progressively stretched from whatever width it may have been sensed by the aperture 132 to the width which it must assume in accordance with the transverse adjustment of the tenter chain 62.

Inasmuch as the tenter chain 62 is carried through an arcuate path as it passes around the idler sprocket 108 a plate 134 is positioned above the pins 82 in such arcuate path (see FIGS. 3 and 4). The plate 134 serves to lift the edge 14c of the fabric in order to hold it out of contact with those pins 82 which are following such arcuate path. The plate 134 terminates in an edge 136 beyond which the fabric may engage the pins 82 which are moving in a linear path. A circular brush 133 having radially extending bristles is mounted on an idler shaft 135 which rotates in a bracket 137 secured to the plate 124. The brush serves to press the edge 14c of the fabric downwardly upon the pins 82. Since the pins 82 are slightly canted, as seen in FIG. 5, the fabric will be firmly engaged.

It will be understood that the extension 106 for the tenter chain 64 on the opposite side of the machine will be provided with mechanism which duplicates that just described whereby an aperture 138 will be effective to guide the corresponding edge of the fabric into engagement with the pins 84.

Referring now to FIGS. 1, 3 and 5, a bracket 70 for supporting the tenter chain guide 66 is preferably positioned directly beneath the vertical shaft 112 about which the edge-guiding extension 104 is pivoted. A similar bracket 72 is provided for guide 68, shaft 114, and extension 106 of tenter chain 64. This assures rigid maintenance of desired spacing between the tenter chains at the point where the parallel runs thereof begin.

In FIGS. 3, 4 and 5 there are shown certain details of a suitable construction for the tenter chain guides 66 and 68 as well as one suitable construction for the chains 62 and 64. In said FIGS. 3, 4 and 5 the guide 66 and chain 62 are shown, it being understood that the guide 68 and chain 64 are similar in construction. The guide 66 may consist essentially of a horizontally disposed plate 140 upon which the tenter chain 62 rests. The tenter chain 62 includes a sprocket chain 142 of any desired construction which is made up of pivotally interconnected links. As shown in the drawings, every other link of the sprocket chain 142 has secured thereto a plate 144 which extends laterally on either side of the chain (see FIG. 5). The outwardly extending portion of each plate 144 carries the tenter pins 82. A retainer 146 extends substantially throughout the length of the guide 66, being secured in vertically spaced relation to the base plate 140 by means such as screws 148 and cylindrical spacer blocks 150. The retainer 146 may be rabbeted at 152 to provide a portion 154 which overhangs the inward extensions of the plates 144. From a consideration of FIG. 5 it will be apparent that when the lower reach 14b is placed under transverse tension between the pins 82 and the pins 84 on the opposite side of the machine the tenter chain 62 would tend to tilt inwardly. The overhanging portions 154 of the retainer 146 prevent such tilting and thus maintain the tenter chain 62 in proper position for holding the fabric to the desired predetermined width. Although it is not shown in the drawings, a retainer similar to the retainer 146 may be provided on the pivoted extension 104 to stabilize the tenter pins in the edge guiding apparatus. It will be understood that the construction just described is also employed in connection with the tenter chain 64 on the other side of the machine.

From a consideration of FIGS. 1 and 2, it will be apparent that the roll 10 and the standards 16, 20 upon which it is supported are spaced from the adjacent end of the tenter chains 62 and 64 to provide an open draw of the lower reach 14b of the fabric. As indicated by the arrows in FIG. 2, for example, the lower reach 14b of the fabric progresses toward the right from the roll 10 to the edge guides 104 and 106 at which point the edge portions only of the fabric will be displaced upwardly so as to ride over the introductory ends of said edge guides as described above (see FIG. 4). However, through a substantial portion of said open draw, the lower reach of the fabric will be flat both transversely and longitudinally and in such portion there is preferably located any suitable form of device for applying any desired treating materials to the fabric. For example, upright supports 153 and 155 may be provided at opposite sides of the machine. Rock shafts 156 and 158 pivoted respectively in the supports 153 and 155 serve to support frame members 160 and 162 which in turn carry troughs 164 and 166 which extend transversely of the machine. The troughs 164 and 166 have rotatably mounted therein applicator rollers 168 and 170. The frame members 160 and 162 and the troughs 164 and 166 comprise a rigid unit which may be tilted about the axis of shafts 156 and 158 to bring either one of the applicator rollers 168 or 170 into contact with the lower surface of the fabric 14 or which may be tilted to a horizontal position in which neither of the rollers will engage the fabric.

Suitable coating, impregnating or other useful liquids may be placed in the troughs 164 and 166 for application to the fabric 14 when desired. For example, when the fabric is to be treated with two-stage resinous material, one of the stages may be applied by one of the rollers and the other stage may be applied by the other roller. It will be understood that the rollers 168 and 170 may be idler rollers, in which event rotation will be imparted thereto by the fabric 14, or that either or both of these rollers may be rotated by power means (not shown) to establish a surface speed having a desired relation with the linear speed of the fabric. Thus the rollers 168 and 170 may be driven at a speed equal to or differing from the linear speed of the fabric in the same direction as the movement of the fabric or opposite thereto, all as may be desired in connection with the application of particular liquids to particular fabrics. Obviously brush or spray or other suitable liquid applicators may be used instead of the roller applicators illustrated. Also, suitable applicators for non-liquid materials such as powders or gases may be used.

When the treatment to be carried out requires heat a suitable heating means is preferably located in such position as to be effective upon the portion of the lower reach 14b of the fabric in the region wherein it is subjected not only to longitudinal tension between the rolls 10 and 12 but also to transverse tension between the opposed parallel portions of the tenter chains 62 and 64. A series of heaters may be provided to operate successively on the moving fabric. The heaters may be of the same or different types and may be operated at the same or different temperatures as required. For illustrative purposes there has been shown two heater units indicated generally at 172 and 174 supported on a frame 176 which in turn is mounted on one or more piston rods 178. The piston rod 178 projects vertically from a cylinder 180 which is connected by conduits 182 and 184 and suitable valves to a source of air or other fluid under pressure. By proper manipulation of the valves (not shown) fluid pressure may be made effective to raise or lower the heating units 172 and 174 relative to the horizontal plane in which the lower reach 14b of the fabric is maintained. Obviously, depending upon the over-all size of the machine and the types of fabric to be treated, there may be provided any desired number of additional heating units which may be separately mounted for vertical movement as aforesaid. Such additional heating units may be located to the right of the units 172 and 174 as viewed in FIGS. 1 and 2.

The heating units 172 and 174 chosen for illustration consist essentially of reflector or enclosure trays 186 and 188 in each of which may be positioned any desired number of heating elements, for example electrical heating elements 190 and 192 which may be energized at will through appropriate wiring such as 194 and 196. By proper control of the amount of electrical input and number of elements energized, as well as by varying the vertical spacing between the heating units 172 and 174 and the fabric 14, accurate control of the temperatures applied to the fabric may be maintained.

It also may be important that heating units of some types may be dropped rapidly away from the fabric by the action of the cylinder 180 in the event the machine may be stopped, thus avoiding any danger of overheating the particular section of the fabric which happens to be above the heaters at that time. Preferably the control valves for the cylinders 180 and the electrical controls for the heaters are interlocked with the driving mechanism 100 for the tenter chains 62 and 64 whereby it will be assured that the heaters will be lowered and turned off automatically whenever the tenter chains stop.

Figures 7, 8:
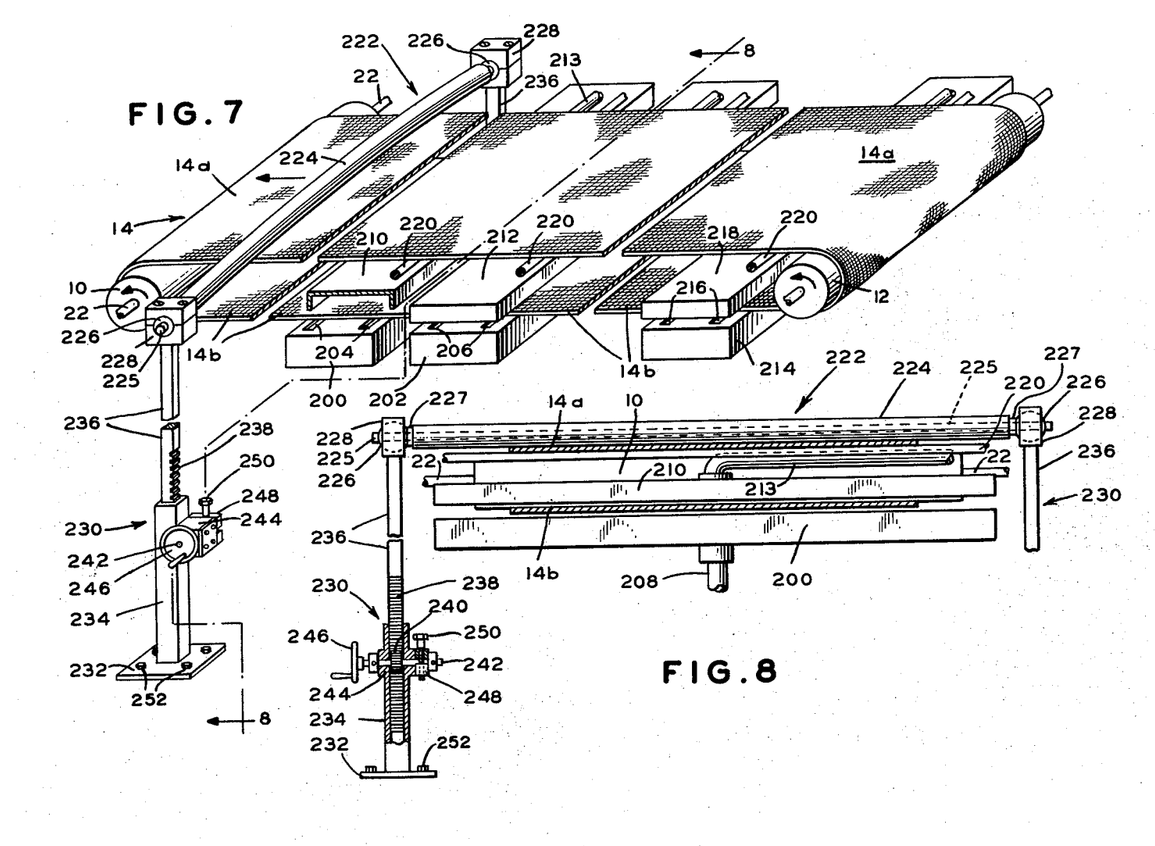
FIG. 7 is a diagrammatic elevational view of a modified form of the apparatus.
FIG. 8 is a section along the line 8—8 in FIG. 7.

Another illustrative example of apparatus embodying the present invention and on which processes within the present invention may be carried out is shown in FIG. 7. in this FIG. 7 a great many details which may be the same as the showing in FIGS. 1 through 6 have been omitted or merely diagrammatically indicated and in some cases similar elements are identified by the same reference numerals as are used in FIGS. 1 through 6.

The machine shown in FIGS. 7 and 8 is intended to be complete as illustrated in FIGS. 1 through 6 and it differs only in that it embodies certain alternative or additional features any one or more of which may be utilized in connection with the machine shown in FIGS. 1 through 6. Thus FIGS. 7 and 8 show an illustrative embodiment of a different form of means for heating the fabric as well as an illustrative form of means for cooling the fabric. Also, these figures show supplemental supporting rolls which may be utilized to prevent sagging of the upper reach 14a of the fabric if so desired. In addition these figures show an illustrative form of fabric spreading means which may be utilized, if needed, to insure against wrinkling of the fabric at the point where the upper reach 14a thereof progresses onto the roll 10.

In FIGS. 7 and 8, heating devices are provided for directing a gentle evenly-distributed upward flow of a fluid heating medium such as heated air or other gas, to the lower surface of the lower reach 14b of the fabric. With suitable collectors above the upper surface of the lower reach 14b of the fabric the heating medium may be withdrawn for recycling. A particular advantage of the use of upwardly directed heating medium is the support which such a medium affords the fabric in the region where it is subjected to elevated temperature. For illustrative purposes there has been shown two heating units 200 and 202 which may be identical or different in detailed construction, as may be desired. Essentially, the heating units 200 and 202 comprise box-like enclosures provided with a plurality of suitably spaced and arranged outlets 204 and 206 which may be in the form of louvres cut in the upper horizontal wall of the box-like enclosures 200 and 202. It will be understood that the louvres 204 and 206 will be distributed throughout the area of said upper wall. Also, the interior of the heating units 200 and 202 may be provided with any suitable form of baffling means (not shown) designed to produce a uniform flow of the heating medium upwardly through all of the louvres in order to subject the full width of the fabric 14 to uniform elevated temperature. As seen in FIG. 8, the heating element 200 is provided with an inlet 208 through which heated air or other gas is introduced at such temperature and at such velocity as may be desired. The heating unit 202 and any additional similar heating units which may be provided, may be supplied with heating medium under desired gaseous pressure from a common source, such as a heat exchanger and blower (not shown). Also the different heating units may be supplied from different sources in order to provide different treating temperatures as the fabric progresses through the machine.

Above each heating unit 200, 202, as well as any additional heating units which may be provided, there is preferably located a collecting unit or hood. For example, there is a hood 210 above the heating unit 200 and a hood 212 above the heating unit 202. The hoods are supported above the lower reach of the fabric and are so located as to receive the heated gas which rises upwardly through the fabric. As shown in FIG. 8 the hood 210 is provided with an outlet conduit 213 through which the collected heating medium may be returned to the heat exchanger which serves to supply the heating unit 200. As will be explained hereinbelow the hoods 210 and 212 are removably supported so that they may be positioned after the endless fabric 14 has been threaded around the rolls 10 and 12.

As discussed above in connection with FIGS. 1 through 6, it may be desirable to provide for cooling of the fabric while continuing to maintain it under the transverse and longitudinal tension afforded by the tenter chains 62 and 64 and tension rolls 10 and 12. The provision of sufficient space between the last heater and the roll 12 for cooling in the surrounding atmosphere may be sufficient in many instances. However, if more rapid or more drastic cooling is desired the machine may be equipped with suitable means for directing an evenly distributed flow of fluid cooling medium upon and through the fabric within the lower reach 14b of its path through the machine. For example, one or more cooling units 214 may be positioned beneath the lower reach 14b and located between the last heating unit 202 and the roll 12. The cooling unit or units 214 may be similar in construction to the heating units 202 and may be provided with openings or louvres 216 for distribution of gaseous cooling medium upwardly against the fabric. The cooling units may be supplied with cooled air or other gas from a refrigerating unit and blower (not shown). Also, a hood 218 may be provided to collect the cooling medium, after it has passed through the fabric 14, for recirculation if so desired.

It will be understood that the heating units 200, 202, and the cooling unit or units 214 are preferably of such width as to extend transversely of the machine for the full width of the widest fabric for which the machine is designed. When a narrow fabric is being treated it may be desirable to close off those louvres in the heating units as well as the cooling units, when the latter are employed, which extend transversely beyond the edges of the fabric.

Cooling of the fabric also may be provided by circulation of a suitable cooling medium such as a liquid or air or other gas through the roll 12. To this end the roll 12 may be made hollow and provided with a hollow shaft or with hollow glands, all as is well known in the art.

In addition to their utility as heating and cooling units, devices such as those shown at 200, 202 and 214 may be used for the distribution of gaseous material or vapors upon the fabric for reaction with the material from which the fabric is made or with materials with which the fabric may be coated or impregnated, for example, by the applicator rolls 168 and 170.

By proper choice of the volume and velocity of upward flow of gaseous heating, cooling or treating mediums from the units 200, 202 and 214 with respect to the porosity of the particular fabric being treated, the fabric may be supported in a substantially perfect horizontal plane between the tenter chains throughout its travel above such units. By thus overcoming the tendency of the fabric to sag of its own weight in the critical zones in which it may be heated, cooled or otherwise treated the final dimensions of the fabric and the uniformity thereof throughout its length and width may be more precisely established.

It may be desirable to avoid subjecting the upper reach 14a of the fabric to the stresses incident to extending unsupported between the rolls 10 and 12. It will be recognized that the unsupported upper reach 14a will tend to sag both longitudinally and transversely thus causing unequal stresses in different regions of the fabric. In any instance wherein such unequal stresses are likely to produce unequal deformation of permanent nature it is preferred to provide supplemental supports between the rolls 10 and 12 which serve to divide the span into smaller increments with attendant reduction in stresses.

Thus, in FIGS. 7 and 8 there are illustrated several supplemental supporting rolls 220, the upper peripheries of which preferably lie substantially in the horizontal plane which includes the upper peripheries of the rolls 10 and 12. The rolls 220 preferably are individually mounted for rotation in suitable demountable bearing frames supported from overhead structures (not shown). Also, they may be supported upon portable stands which may be similar to the stands 230 which will be described below in connection with the fabric spreading device. The number and spacing of the rolls 220 is a matter of judgment, taking into account the length, width and individual characteristics of any particular fabric. It will be recognized that the rolls 220 must be positioned after the fabric has been threaded onto the rolls 10 and 12. Also, it will be appreciated that for fabrics of great width the rolls 220 may be so great in length as to sag sufficiently to permit unwanted distortion of the fabric. In such cases the rolls 220 may be "crowned" to provide linear supports in spite of the sag or the sag may be counteracted in any of the manners well known in the art.

Since the upper reach 14a of the fabric 14 will be subjected to substantial longitudinal tension during certain of the operations performed in accordance with the present invention, there may be occasions where the natural tendency of the fabric to "narrow" under tension will cause difficulty as the fabric progresses around the roll 10. To avoid such difficulties any of the well known types of fabric spreaders may be utilized in a position just ahead of the roll 10. Preferably a spreader roll 222 of the type known as a "Mt. Hope" roll is provided as shown in FIGS. 7 and 8. The spreader roll 222 chosen for illustration consists of a freely rotatable flexible jacket 224 carried on a transversely bent bar 225, the opposite ends of which are secured against rotation in generally spherical bodies 226. Bearings 227 are positioned between the bodies 226 and the ends of the flexible jacket 224 to ensure free rotation of the latter relative to the bar 225. The spherical bodies 226 are normally clamped in adjusted position but may be released and rotated to establish desired relation between the bow in the bar 225 and the fabric to achieve the desired spreading effect, all as is well known in the art. The spreader roll 222 is removably carried in split blocks 228 carried by any suitable or convenient support such as stands 230 which may be positioned on opposite sides of the machine, preferably after the fabric has been threaded on the rolls 10 and 12. The split blocks 228 are provided in order that the stands 230 and spreader roll 222 may be quickly assembled and disassembled when desired.

The stands 230 shown in FIGS. 7 and 8 are illustrative only and may take any form. However, it is preferable that they afford vertical adjustment of the spreader roll 222 in order that it may be positioned for best operation under varying conditions. Thus, the stands 230 may comprise a base 232 having a hollow square socket 234 adapted to telescopically receive a square post 236 provided with rack teeth 238. The post 236 may be moved vertically within the socket 234 as by a pinion 240 meshing with the rack teeth 238. The pinion 240 may be secured to a shaft 242 in a housing 244 mounted near the upper end of the socket 234. A hand wheel 246 may be secured to the shaft 242 for rotation of the pinion 240 when desired. A clamp 248 may be secured to the housing 244 and may be provided with a screw 250 for setting the clamp upon the shaft 242 to hold the post 236 in any desired position of vertical adjustment.

The stands 230 may be permanently or temporarily secured to the floor, as desired, by lag screws 252 or other suitable means. It will be apparent that the spreader roll 222 may be supported by suitable demountable overhead structure if so desired.

From FIGS. 7 and 8 it will be apparent that the spreader roll 222 is intended to be pressed downwardly upon the upper surface of the upper reach 14a of the fabric 14 along a curved line transverse to the path of movement of the fabric and just ahead of the roll 10. The movement of the fabric 14 toward the left as viewed in FIG. 7 will cause the jacket 224 of the spreader roll 222 to rotate in a clockwise direction. The bow or bend in the bar 225 is so adjusted as to spread the fabric 14 to the extent which may be necessary to ensure that it will lead smoothly onto the roll 10 without danger of forming creases or wrinkles.

As stated above, stands similar to or identical with the stands 230 may be used to support the supplemental rolls 220 described above. Split bearings similar to the split blocks 228 carried by the stands 230 are provided for rotatably receiving the rolls 220 as they are inserted beneath the upper reach 14a of the fabric after it has been threaded upon the rolls 10 and 12.

Overhead structure (not shown) or stands similar to or identical with the stands 230 also may be used to support the heating units 200 and 202, the cooling unit 214 and the hoods 210, 212 and 218. Such stands are particularly suitable for removably supporting the hoods 210, 212 and 218 inasmuch as such hoods should be mounted in desired position after the fabric has been threaded upon the rolls 10 and 12. It will be recognized that the heating and cooling units are positioned beneath the lower reach 14b of the fabric and thus do not need to be mounted for quick removal. Thus, any suitable permanent supporting means may be utilized for these units if so desired.

From the foregoing description of preferred forms of apparatus it will be apparent that there is disclosed a novel combination of spaced parallel guide rolls and a tenter frame for the precision processing of endless fabrics. By properly relating the simultaneously applied longitudinal and transverse tensioning of the fabric with regard to the construction of the fabric as woven, it may be stabilized in the particular conditions required to produce desired final specifications. Longitudinal tensioning alone of an unstabilized fabric will tend to cause elongation and narrowing of the fabric and the yarn counts will be changed. The count of the longitudinally extending yarns i.e. the number of warp yarns or weft yarns per inch will be increased while that of the transverse yarns will be reduced. This results from the fact that longitudinal tension will tend to straighten the longitudinal yarns and will tend to curve or to increase the curvature of the transverse yarns at each crossing. Under the most precisely controlled weaving procedures there will be some unavoidable variation in the weight or other characteristics of the yarns as well as similar variation in the tensions under which they are woven. Thus, when the yarns in one direction only of the fabric are placed under tension in a finishing or setting operation the final count, i.e. construction, of the fabric is not at all likely to be sufficiently uniform in each increment of width and length to meet the exacting standards for certain end uses. For example, Fourdrinier cloths for the manufacture of certain grades of paper must meet extremely high standards with respect to uniformity of porosity. By the use of the present invention the fabric is progressively moved through a zone in which it is controlled in both directions and in which it is stabilized. As a result of this invention a fabric which has been woven with great care and which has been painstakingly burled, if necessary, may be subjected to quite drastic finishing and stabilizing operations such as wetting, drying, heat setting, resin treating and the like with assurance that the fabric will be finished in substantially the degree of perfection existing prior to such treatments. The importance of such a result is made most impressive when achieved with an endless open-weave mesh-like fabric made of synthetic yarns such as nylon, for example.

When a fabric intended for use as a Fourdrinier cloth is woven endless, that is as a continuous tube from which belt-widths are cut, the warp yarns will extend transversely of the belts. The warp yarns are crimped when the fabric is beat up in the loom and the weft yarns are relatively straight. When such a fabric is treated in accordance with this invention, it is the relatively straight weft yarns which are subjected to longitudinal tension between the rolls 10 and 12. It is highly desirable to retain the crimps in the warp yarns and to apply enough tension to the weft yarns to enhance their straightness as much as reasonably possible. If this is done the knuckles will be in the transverse yarns and the wear upon them in use will not progressively decrease the tensile strength of the fabric in the all-important longitudinal direction. By maintaining precise control of the width of the fabric throughout the critical steps and simultaneously controlling the longitudinal tension to establish the length of the fabric, the desired presence of knuckles in the transverse yarns can be achieved without danger of causing local irregularities in count in either direction.

A typical method of finishing and setting of a fabric woven endless from nylon yarns of any desired construction in both warp and weft will now be given. The finished fabric of this example is intended to be suitable for use in a Fourdrinier papermaking machine as a forming fabric in the place of the metallic "wires" heretofore used. The fabric will have been ordered in accordance with specifications which include length, width, transverse yarn count and longitudinal yarn count. The fabric is woven in a length (circumference of the tube while the fabric is in the loom) properly related to the ordered length. It has been found preferable, with nylon, to make the woven length slightly less than the ordered length. For example in a particular fabric, depending on the specific yarns used in both warp and weft, the woven length may be from 3% to 4% less than the ordered length so that the finally stabilized fabric will exhibit a minimum tendency toward an increase in length in use. In such a fabric the woven warp count is slightly more than the ordered transverse yarn count, the percentage of such increase being carefully calculated to correspond with the amount by which the woven length is less than the ordered length. The woven pick count is proportionately slightly less than the ordered longitudinal yarn count. The tubular fabric from the loom is cut transversely of the warp yarns to a width sufficiently greater than the ordered width to provide waste edge areas which may be trimmed off after treatment is completed.

The fabric is then inspected, burled and repaired if necessary and may be laundered if so desired.

The fabric is then placed upon the machine shown herein in the manner described above. The roll 12 is moved to a position in which the fabric will run around the rolls without substantial longitudinal tension. The tenter chains 62 and 64, during this operation, have been spaced to a width greater than the fabric and the edge guides 104 and 106 are inactive and swung out of the way. The rolls 10 and 12 are then slowly rotated to run the fabric and the fabric is centered lengthwise of the rolls and is manipulated to arrange the transverse yarns parallel with the axes of the rolls.

The tenter chains are then moved inwardly so that the pins will lie fairly close to the edges of the fabric. Then, being assured that the transverse yarns are running at true right angles to the path of travel of the fabric, the edge guiding devices 104, 106 are put into operation. To assist in judging the accuracy of transverse alignment of the transverse yarns, it may be found helpful, although not essential, to provide differently colored warp yarns at spaced intervals in the fabric or it may be preferred to place spots of colored paint at the opposite ends of selected transverse yarns in the cut-off piece before the same is placed on the machine.

Preferably, the fabric is first led onto the tenter chains 62, 64 with the tenter chains fairly close to the edges of the fabric so that it is placed under quite moderate transverse tension during at least the first few complete circuits of the fabric upon the machine. Thereafter, the chains are slowly spread apart and the roll 12 is moved away from roll 10 whereby the fabric is gradually brought out to the dimensions desired at this stage of the treatment. During the preliminary circuits and the gradual spreading operations aforesaid the fabric may be inspected, for example, as it passes over the roll 10, and usually it will be preferable to drive the rolls 10 and/or 12 and the tenter chains 62, 64 at slow synchronized speeds to facilitate inspection as well as to insure proper conformation of the fabric to the machine in the dimensions desired at this time. The operations described in this paragraph are of general application irrespective of the specific fabric being placed on the machine. It will be apparent that the dimensions desired at this point may vary with different types of fabrics and with the type of treatment which is to follow.

For the typical operation selected as an example herein the fabric will be dry and unheated at the time the positioning and inspection are completed. The tenter chains will be so spaced as to bring the count of the longitudinal yarns to the ordered count. The rolls 10 and 12 will be spaced to bring the length of the fabric to the length to which it was woven, e.g., usually somewhat less than the ordered length. During the heat treatment or treatments which are to follow the width of the fabric is usually held constant and the length is increased by further movement of the roll 12 so that the fabric is finally set in a length at or near the ordered length.

For purposes of illustration the selected typical example will be impregnated with a heat settable resin in liquid form, the resin will be dried at a moderately elevated temperature, cured at a higher temperature and both the resin and the fiber in the fabric will be heat set at still higher temperature. During these operations the fabric is maintained at the same width and the roll 12 may be moved away from the roll 10 to place the fabric under tension to progressively increase its length before curing or heat setting occurs. During curing and heat setting the fabric is maintained under such tension as is required to hold it at the desired final length.

For example, the typical fabric aforesaid may have a single heat settable resin solution applied. In this event one of the applicator rolls, say roll 168, may be used. The solution is supplied to the trough 164 and the roll 168 is swung upwardly as shown in FIG. 2 into contact with the fabric 14. The roll 168 may be permitted to rotate or may be driven as desired and the fabric is conducted through one complete circuit of the machine. Preferably the roll 168 is driven in the direction of movement of the fabric and at a higher surface speed than that of the fabric. During this complete circuit of the fabric the guide roll 12 is moved progressively away from roll 10 to take up any slack due to moistening of the fabric and in a typical case the fabric will have been brought out to its finished length during application of the liquid.

After the complete circuit in which the liquid is applied the applicator roll 168 may be stopped and the fabric may be driven through several circuits while it is dragged over the stationary roll 168 to promote even distribution of the liquid upon the fabric. The heaters may be turned on and raised to operative position during this time and it has been found advantageous to continue dragging of the fabric over the stationary roll 168 until the applied liquid is substantially dry.

During the drying operation the heaters may be adjusted and regulated to establish the desired drying in the zone through which the fiabric passes. When an aqueous solution or mixture of heat settable resin has been applied the temperature, although above 212° F., preferably is not so high as to cause substantial curing of the resin before most of the moisture has been evaporated.

After drying of the resin while maintaining the impregnated fabric in the desired width and length as discussed above, the heaters may be adjusted and regulated to establish a temperature of the fabric itself appropriate for curing the impregnating resin. This may be a partial curing operation, for example, at a temperature such that the curing of the resin will advance at a practical and useful rate but yet below the desired final curing temperature whereby to reduce the time of exposure of the fabric to the final curing temperature. This partial curing step may be extended over several complete circuits of the fabric through the machine.

After the curing step has been completed the temperature of the impregnated fabric may be raised to a final heat setting temperature. If the applied resin is thermosetting and has not been completely cured or set in the preceding operations, it may further set during the final step. When the fiber from which the fabric is woven is nylon, as in the typical example, the fabric will be "set" at such final temperature, although it will be understood that nylon and similar fibers are not thermosetting but rather are capable of assuming a "set" which is quite stable at any temperature reasonably below the "setting" temperature. Both types of heat "setting" are intended to be encompassed in this application. The final setting temperature is selected with regard to the base fabric, the impregnating material and the end use of the stabilized fabric. In some cases the low-temperature drying or intermediate temperature curing may be omitted or combined or the entire operation may be carried out under the same conditions.

When the fabric is nylon, impregnated with aqueous thermosetting resin, typical drying, curing and setting temperatures may be in the following general order. The drying step may be carried out under conditions in which the temperature of the fabric will not exceed about 250° F. when it is dry. The intermediate curing temperature of the fabric may be about 350° F. and the final temperature may be about 450° F. In such a case it is not necessary to utilize cooling units between the heaters and the roll 12, because of the nature of the fiber and the impregnating resin. With other combinations, cooling units may be advisable as pointed out above. However, in the present example the heaters may be shut off after the predetermined heat-setting time has elapsed and the fabric may be permitted to cool in the ambient atmosphere while it continues to run through several complete circuits through the machine.

When the fabric has cooled the machine may be stopped if so desired. It will be apparent that with the combination of fabric and resin chosen for this example the fabric should be driven continuously through at least the curing, heat setting and cooling steps to avoid any chance of deformation of the fabric. However, if an emergency requires that the machine be stopped the heaters should be turned off and lowered as rapidly as possible. The apparatus described above includes facilities for such operations and serious damage may frequently be avoided by prompt action.

It will be understood that it is a particular feature of the present invention that the fabric being treated is maintained under control with respect to length and width throughout all critical phases of its treatment. In the typical example, the undulating warp yarns run transversely of the fabric and since the fabric is to be used as a Fourdrinier cloth, it is desired to maintain the undulations in the warp yarns and to make the longitudinally extending weft yarns as straight as possible. For this reason the fabric is brought out to final width, to establish the ordered weft count, at a time when the longitudinal tension is somewhat less than that required to pull the fabric out to final length. At such time the relatively less-tensioned weft yarns will be free to flex somewhat as the warp yarns are progressively tensioned with the result that the weft count will be uniformly reduced throughout the width of the fabric to the count in which it is desired to set the fabric. Thereafter the fabric is placed under increased longitudinal tension to pull all of the weft yarns into substantially straight condition. As the weft yarns progressively straighten the tension on the warp yarns will be increased in uniform increments throughout the width of the fabric, thus emphasizing the undulations thereof without danger of producing local irregularities in either weft or warp count.

For other fabrics or for other uses of similar fabrics different specific requirements may be met by slightly different utilization of the method and apparatus of the present invention. For example, in a fabric which has been woven as a flat web and which has been spliced or otherwise joined to form an endless structure the warps will run lengthwise. It may be desirable to reduce or eliminate the undulations in the warps and to force the transverse wefts into undulating form before stabilizing the fabric. In such event the application of longitudinal tension would be kept ahead of the transverse tension in a predetermined manner to produce the desired final configuration.

It is preferred to cut the fabric to final width while on the machine since the machine affords the possibility of cutting the edges precisely. To this end a suitable slitting device, such as a hot knife (not shown) or a rotary slitting blade (not shown) may be used to cut one edge and then the other or a pair of such devices may be used to simultaneously cut both edges. The slitting device or devices can be used beneath the machine, for example between the last heater and the roll 12. Alternatively, such device or devices may be used against the surface of either the roll 12 or roll 10 as desired. In any event, the central portion of the fabric will be cut to ordered width and the waste edges thereafter may be disengaged from the tenter pins.

The finished fabric is then removed from the machine by withdrawing it from the ends of the rolls 10 and 12 in an operation which may be substantially a reversal of the procedure described above for placing the fabric upon the machine. The specific procedure for such removal will vary with the characteristics of the particular finished fabric and the use for which it is intended and such procedures form no part of the present invention.

In the typical example set forth above the Fourdrinier cloth was impregnated with a heat settable resinous material in a single operation. It will be understood that certain heat settable materials may require application in successive stages, for example, a resin might be first applied and either with or without drying, an accelerator or modifier or perhaps a different resin may be applied later. The applicator rolls 168 and 170 may be used successively in such instances or any suitable applicator or applicators may be substituted for said rolls.

In the above typical example and the discussion of alternative procedures, there has been brought out the adaptability of this invention to the treatment and stabilization of fabrics in a number of steps. Other operations or combinations of operations can be performed on the apparatus in which the precise control of dimensions in both directions of the fabric is of great importance. For example, laundering followed by rinsing and drying or heat "setting" with or without coating or impregnating materials can thus be accomplished and the finished fabric will be appropriately stabilized in flat smooth condition with the dimensions required. Different dimensions and/or different tensions may be established in connection with a particular piece of fabric during the performance of different steps. The apparatus and the method for providing and utilizing such control in both longitudinal and transverse directions of a fabric are believed to be afforded for the first time by the present invention.

The method and apparatus are of particular value in the heat treatment of fabrics and illustrative forms of heating devices have been described. Other forms and arrangements of heating devices may be utilized in the apparatus and method of this invention, for example radiant, high frequency, convected or direct contact heating devices may be used. Also, the heating devices may be positioned above the fabric rather than below as illustrated herein and such positioning may be preferable in any instance wherein liquids which may be applied to the fabric are likely to drip from the fabric and create problems with heaters located beneath the fabric. When gaseous heating mediums are used, as in the form shown in FIGS. 7 and 8, it may be preferred to utilize a protective or inert gas as the heating medium. As a simple example, the product of combustion of fuel may be used to inhibit oxidation of the fabric or of some material which may be applied to the fabric.

The above detailed description includes disclosure of preferred forms of apparatus for placing a fabric under accurately controllable conditions to establish predetermined dimensions, yarn counts, tensions and configurations of the fabric during treatments of the fabric in which control of any one or more of these predetermined factors is desired. Also there has been disclosed in more general terms various devices for performing typical operations on a fabric in which the accurate control of such conditions is particularly desirable. In addition there have been disclosed methods for treatment of fabrics including methods for the production of flat and stable endless fabrics suitable for use as Fourdrinier cloths.

The apparatus and method for control of the fabric provide simultaneous control of longitudinal and transverse dimensions of the fabric in a zone through which the fabric is progressively and repeatedly moved. This is an important aspect of this invention which represents a novel departure from the apparatus and methods heretofore employed in the treatment of fabrics on tenter frames. Heretofore it has been customary when a fabric is to be shrunk or pulled out to width on a tenter frame, to "overfeed" the fabric lengthwise to the pins or clips on the tenter chains to provide a predetermined amount of slack between each successive pin or clip to permit the fabric to shorten in length. Such procedure cannot afford the precision in the finally treated fabric which is afforded by the present invention in which the changes in length and width may be gradually made while the edges are being continuously reengaged by the pins or clips on the chains. Thus the pins or clips may progressively engage the edges in new lengthwise relationships as the length of the fabric is being changed and will be firmly and accurately engaged when the fabric reaches the dimensions or other conditions requisite for heat setting or similar operations.

What is claimed is:

1. In an apparatus for treating a moving length of fabric in the form of an endless belt the combination of parallel guide rolls, means for rotating at least one of said guide rolls, said guide rolls being mounted to receive said endless fabric and to engage spaced transverse portions thereof to move said fabric through an endless path which includes a reach in which said fabric extends lengthwise between two of said rolls substantially in a plane tangent to the surfaces thereof, means for varying the spacing between said two guide rolls to place the fabric in said reach under any desired degree of tension in the direction of movement of said fabric within said reach, tenter means engageable with opposed edge portions of said fabric within said reach, means for driving said tenter means at the linear speed of the fabric within said reach, and means for varying the spacing between said tenter means to place the portion of said fabric which extends between said tenter means under any desired degree of tension in a direction transverse to the direction of movement of the fabric within said reach.

2. In an apparatus for treating a moving length of fabric in the form of an endless belt the combination of parallel guide rolls, means for rotating at least one of said guide rolls, said guide rolls being mounted to receive said endless fabric and to engage spaced transverse portions thereof to move said fabric through an endless path which includes a reach in which said fabric extends lengthwise between two of said rolls substantially in a plane tangent to the surfaces thereof, means for varying the spacing between said two guide rolls to place the fabric in said reach under any desired degree of tension in the direction of movement of said fabric within said reach, tenter means engageable with opposed edge portions of said fabric within said reach, means for driving said tenter means at the linear speed of the fabric within said reach, means for varying the spacing between said tenter means to place the portion of said fabric which extends between said tenter means under any desired degree of tension in a direction transverse to the direction of movement of the fabric within said reach, and means for treating that portion of said fabric which extends between said tenter means.

3. In an apparatus for treating a moving length of fabric in the form of an endless belt the combination of parallel guide rolls, means for rotating at least one of said guide rolls, said guide rolls being mounted to receive said endless fabric and to engage spaced transverse portions thereof to move said fabric through an endless path which includes a reach in which said fabric extends lengthwise between two of said rolls substantially in a plane tangent to the surfaces thereof, means for varying the spacing between said two guide rolls to place the fabric in said reach under any desired degree of tension in the direction of movement of said fabric within said reach, a pair of spaced parallel tenter chains extending lengthwise of said reach and lying substantially within said plane, said tenter chains having means engageable with opposed edge portions of said fabric within said reach, means for driving said tenter chains at the linear speed of the fabric within said reach, and means for varying the spacing between said tenter chains to place the portion of said fabric which extends between said tenter chains under any desired degree of tension in a direction transverse to the direction of movement of the fabric within said reach.

4. In an apparatus for treating a moving length of fabric in the form of an endless belt the combination of parallel guide rolls, means for rotating at least one of said guide rolls, said guide rolls being mounted to receive said endless fabric and to engage spaced transverse portions thereof to move said fabric through an endless path which includes a reach in which said fabric extends lengthwise between two of said rolls substantially in a plane tangent to the surfaces thereof, means for varying the spacing between said two guide rolls to place the fabric in said reach under any desired degree of tension in the direction of movement of said fabric within said reach, a pair of spaced parallel tenter chains extending lengthwise of said reach and lying substantially within said plane, said tenter chains having means engageable with opposed edge portions of said fabric within said reach, means for driving said tenter chains at the linear speed of the fabric within said reach, means for varying the spacing between said tenter chains to place the portion of said fabric which extends between said tenter chains under any desired degree of tension in a direction transverse to the direction of movement of the fabric within said reach, and means for treating that portion of said fabric which extends between said tenter chains.

5. In an apparatus for treating an endless belt of fabric the combination of parallel guide rolls, means for rotating at least one of said guide rolls, said guide rolls being mounted to receive said endless belt of fabric and to engage transverse portions thereof to move said fabric through an endless path which includes a reach in which said fabric extends lengthwise between said rolls, means for varying the spacing between said guide rolls to place the fabric in said reach under tension, a pair of spaced tenter chains extending lengthwise of said reach and lying along opposite sides thereof, each of said tenter chains having means engageable with the adjacent edge portions of said fabric within said reach and having a first portion mounted for pivotal movement about an axis normal to said reach and a second portion extending parallel to the path of said fabric, means for pivoting each said first portion about the axis thereof toward said reach to engage an edge portion of said fabric with said engageable means and for feeding said edge portions into the second portions of said tenter chains as said fabric is fed through said reach, means for varying the spacings between said tenter chains to place the portion of said fabric extending between said tenter chains under tension in a direction transverse to the direction of movement of the fabric within said reach, and means for treating that portion of said fabric extending between said tenter chains.

6. In an apparatus for treating an endless belt of fabric the combination of parallel guide rolls, means for rotating at least one of said guide rolls, said guide rolls being mounted to receive an endless belt of fabric and to engage transverse portions thereof to move said fabric through an endless path around said guide rolls, means for varying the spacing between said guide rolls to place the fabric therebetween under tension, a pair of spaced parallel tenter chains extending lengthwise between said guide rolls and mounted at the opposite sides of said path to receive said fabric therebetween, each of said tenter chains having means engageable with opposite edge portions of said fabric as said fabric is fed between said tenter chains, means for engaging the opposite edge portions of said fabric with said engageable means whereby the said edge portions are outwardly fed as said fabric passes between said spaced tenter chains to place the portion of said fabric in engagement with said engageable means under tension in the direction transverse to the direction of movement of the fabric, means for varying the spacing between said tenter chains, means for driving said tenter chains and means intermediate said spaced tenter chains for treating said fabric as said fabric passes between said tenter chains.

7. In an apparatus for treating an endless belt of heat settable fabric the combination of a first guide roll mounted for rotation about a first axis, a second guide roll mounted for rotation about a second axis spaced from and parallel to said first axis, means for driving at least one of said guide rolls, means for varying the spacing between said guide rolls, said guide rolls being mounted to receive an endless fabric and to engage spaced transverse portions thereof to move said fabric through an endless path around said first guide roll to said second guide roll and around said second guide roll to said first guide roll, a first tenter means mounted at one side of said path and in axial alignment therewith, a second tenter means mounted adjacent the opposite side of said path and in axial alignment therewith, means for engaging the marginal edges of said fabric with said tenter means as said fabric is fed therebetween, means for varying the spacing between said tenter means to place the portion of said fabric extending therebetween under tension in a direction transverse to the direction of movement of the fabric around said rolls, means for driving said tenter means, and means intermediate said tenter means for heating said fabric as said fabric extends between said tenter means to set said fabric.

8. In an apparatus for treating an endless belt of fabric the combination of a first guide roll mounted for rotation about a first axis, a second guide roll mounted for rotation about a second axis spaced from and parallel to said first axis, means for driving at least one of said guide rolls, means for varying the spacing between said guide rolls, said guide rolls being mounted to receive an endless fabric and to engage spaced transverse portions thereof to move said fabric through an endless path around said first guide roll to said second guide roll and around said second guide roll to said first guide roll, a first tenter means mounted at one side of said path and in axial alignment therewith, a second tenter means mounted adjacent the opposite side of said path and in axial alignment therewith, means for engaging the marginal edges of said fabric with said tenter means as said fabric is fed therebetween, means for varying the spacing between said tenter means to place the portion of said fabric extending therebetween under tension in a direction transverse to the direction of movement of the fabric around said rolls, means for driving said tenter means, means adjacent one of said guide rolls for contacting said fabric to maintain said fabric flat on said roll, applicator means adjacent one end of said tenter means for applying a heat settable composition to said fabric as said fabric passes said applicator and means intermediate said tenter means for setting said heat settable composition.

References Cited in the file of this patent

UNITED STATES PATENTS

| | | | |
|---|---|---|---|
| 634,307 | Neidhardt | Oct. 3, | 1899 |
| 891,914 | Cox | June 30, | 1908 |
| 1,235,043 | Meers | July 31, | 1917 |
| 1,514,748 | Wilson | Nov. 11, | 1924 |
| 1,514,749 | Wilson | Nov. 11, | 1924 |
| 2,434,111 | Hawley et al. | Jan. 6, | 1948 |
| 2,451,343 | Kunzle | Oct. 12, | 1948 |
| 2,512,128 | Albright | June 20, | 1950 |
| 2,518,740 | Albright | Aug. 15, | 1950 |
| 2,791,021 | Anderson | May 7, | 1957 |
| 2,821,771 | Skeer | Feb. 4, | 1958 |
| 2,907,093 | Draper | Oct. 6, | 1959 |
| 2,943,375 | Hindle | July 5, | 1960 |

FOREIGN PATENTS

| | | | |
|---|---|---|---|
| 22,381 | Germany | May 26, | 1883 |
| 694,192 | Germany | July 26, | 1940 |
| 722,550 | Germany | July 13, | 1942 |
| 901,165 | Germany | Jan. 7, | 1954 |